(12) United States Patent  
Shizuno

(10) Patent No.: US 8,103,617 B2  
(45) Date of Patent: Jan. 24, 2012

(54) DISTRIBUTED DIRECTORY SERVER, DISTRIBUTED DIRECTORY SYSTEM, DISTRIBUTED DIRECTORY MANAGING METHOD, AND PROGRAM OF SAME

(75) Inventor: Takayuki Shizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 367 days.

(21) Appl. No.: 12/379,103

(22) Filed: Feb. 12, 2009

(65) Prior Publication Data

US 2009/0204571 A1    Aug. 13, 2009

(30) Foreign Application Priority Data

Feb. 13, 2008 (JP) ................................ 2008-032210

(51) Int. Cl.  
*G06F 7/00* (2006.01)  
*G06F 17/00* (2006.01)  
(52) U.S. Cl. ........ 707/602; 707/613; 709/203; 709/219; 709/329
(58) Field of Classification Search ................ None  
See application file for complete search history.

(56) References Cited

U.S. PATENT DOCUMENTS

| | | | | |
|---|---|---|---|---|
| 6,675,205 | B2 * | 1/2004 | Meadway et al. | 709/219 |
| 7,818,402 | B1 * | 10/2010 | Zhang | 709/219 |
| 2003/0172163 | A1 * | 9/2003 | Fujita et al. | 709/226 |
| 2003/0195962 | A1 * | 10/2003 | Kikuchi et al. | 709/226 |

OTHER PUBLICATIONS

"Survey and Comparison of Peer-to-Peer Overlay Network Schemes" Eng Keong Lua, et al. IEEE Communications Survey and Tutorial, Mar. 2005, pp. 72-93.*  
Eng Keong Lua, et al. "Survey and Comparison of Peer-to-Peer Overlay Network Schemes" IEEE Communications Survey and Tutorial, Mar. 2005, pp. 72-93.*  
"Technological movement of search service on the web site" and "Information processing" Yoshihiko Hayashi, et al. vol. 39 No. 9, pp. 861-865, Sep. 1998.  
"A Survey and Comparison of Peer-to-Peer Overlay Network Schemes" Eng Keong Lua, et al. IEEE Communications Survey and Tutorial, Mar. 2004, pp. 1-22.

* cited by examiner

*Primary Examiner* — Tim T Vo  
*Assistant Examiner* — Loan T Nguyen  
(74) *Attorney, Agent, or Firm* — McGinn IP Law Group, PLLC

(57) ABSTRACT

There is provided a distributed directory server to be used in a plurality of distributed directory servers connected to one another through a network and in a distributed directory system made up of a plurality of user devices, which includes a transmitting/receiving section to transmit or receive messages between user devices and other distributed directory servers, a use history notifying section to read a totalized information database and to provide notification for instructing the transmitting/receiving section to transmit data on the number of times of using Pushed data to the distributed directory server, and an evaluation function computing section to determine operation rules for Push distribution command and Pull search command to an index for every management unit.

21 Claims, 9 Drawing Sheets

| SERVER 121 | IP ADDRESS / PORT NUMBER 122 |
|---|---|
| S2 | xxx.xxx.xxx.xxx:xxx |
| S3 | xxx.xxx.xxx.xxx:xxx |
| S4 | xxx.xxx.xxx.xxx:xxx |
| ...... | ...... |

FIG. 4

DISTRIBUTED DIRECTORY SERVER, DISTRIBUTED DIRECTORY SYSTEM, DISTRIBUTED DIRECTORY MANAGING METHOD, AND PROGRAM OF SAME

BACKGROUND OF THE INVENTION

1. Field of the Invention

The present invention relates to a distributed directory system to manage servers by distributing information about contents transmitted from many terminals and provide, when a request for information search is made from the terminals, managed information to servers.

2. Description of the Related Art

Recently, in mobile terminals such as a mobile phone, PDA (Personal Digital Assistant), vehicle-mounted terminal, and the like, demands for exchanging, while moving, through a network, a large volume of contents such as voices and videos are being spread among users.

Further, there are also demands for making information generated by street monitoring cameras and/or various sensors be circulated together through a network to make the most use of the information.

Technologies to meet such demands are being studied and, especially, in a state where a large volume of various contents are distributed, it becomes important to deliver information about contents without impairing freshness of contents.

As directory technology supporting the circulation of contents over the current Internet, a P2P being a periodical information collecting means and a distributed management means by using a search robot being a non-management means.

In the periodical information collecting means using a search robot, as disclosed in Non-patent reference 1 (Yoshihiko Hayashi, Yoshitugu Kohashi, "Technological movement of search service on the web site" and "Information processing" Vol. 39 No. 9 p-861-865, September 1998), a search robot called a crawler circulates to collect contents being scattered in servers over the network intensively in an index server to arrange and provide contents information to users.

In the P2P means, as disclosed, for example, in Non-patent reference 2 (Eng Keong Lua, Jon Crowcroft, Marcelo Pias, Ravi Sharma and Steven Lim, "A survey and Comparison of Peer-to-Peer Overlay Network Schemes, IEEE COMMUNICATIONS SURVEY AND TUTORLAL, March 2004), an overlay network is constructed by a user machine participating in the P2P and an index of entire contents information is divided to specify a place where contents information exists in order to provide the same to users.

However, such conventional means as disclosed in the Non-patent references 1 and 2 cannot keep up with a state of frequent production, change, disappearance of technologies in a ubiquitous network society.

For example, in the periodical information collecting means using the search robot, in order to follow frequent updating of contents, it is necessary for many crawlers to frequently circulate in a network, thus requiring huge processes and costs for maintaining serves.

Moreover, in the P2P serving as the distributed management means, lots of servers have to be prepared to provide all contents to all persons who want to have information.

SUMMARY OF THE INVENTION

In view of the above, it is an object of the present invention to provide a distributed directly server, distributed directory system, distributed directory managing method, and programs of the same which enable the minimization of search response to demands of users under the constraint of server costs.

According to a first aspect of the present invention, there is provided a distributed directory server to be used in a distributed directory system made up of a plurality of distributed directory servers and a plurality of user devices connected to one another through a network including a transmitting/receiving unit to transmit or receive messages among the user devices and other distributed directory servers, a use history notifying unit to read a totalized information database and to provide notification for instructing the transmitting/receiving unit to transmit data on the number of times of using Pushed data to the distributed directory server and an evaluation function computing section to determine operation rules for Push distribution and Pull search processes to an index for every management unit.

According to a second aspect of the present invention, there is provided a distributed directory system in which a plurality of distributed directory servers and a plurality of user devices are connected to one another through a network and the plurality of distributed directory servers is the distributed directory server stated in any one of Claim 1 to Claim 17.

According to a third aspect of the present invention, there is provided a distributed directory managing method for managing contents information in a distributed manner in a distributed directory system made up of a plurality of distributed directory servers and a plurality of user devices being connected to one another through a network including a process of checking a management unit for Push-distributed metadata when the distributed directory server receives a Push distribution message from the user device or other distributed directory server, a process of registering the metadata in an index data base, a process of checking operation rules described in an index, a process of forwarding a Push distribution message to other distributed directory server described in operation rules when Push distribution is performed according to operation rules, a process of transmitting/receiving unit's checking a management unit of Pull-searched metadata when a Pull search message is received from a user device or other distributed directory server, a process of referring to an index database and searching an index relating to the metadata, a process of returning the result, by superimposing the same on the Pull search response message, to the user device or other distributed directory server having transmitted the Pull search response message, a process of updating a totalized information database relating to the metadata, a process of checking operation rules described in the index, a process of forwarding a Pull search message to other distributed directory server described in the operation rules when Pull search is performed according to operation rules, a process of updating a forwarding list database, a process of obtaining data on a remaining resource from the resource measuring unit when interruption occurs, a process of obtaining data on a totalized function for the management unit from the totalized information database, a process of calculating costs for Push distribution and Pull search when a destination of each of the Push distribution and Pull search is changed for every management unit and computing an evaluation function, and a process of determining operation rules for Push distribution and Pull search for every management unit from computed results.

According to a fourth aspect of the present invention, there is provided a distributed directory program for making a computer mounted on each distributed directory server in a distributed directory system made up of a plurality of distributed directory servers and a plurality of user devices connected to one another through a network execute processes including a step of checking a management unit for Push-distributed metadata when the distributed directory server receives a Push distribution message from the user device or other distributed directory server, a step of registering the metadata in an index data base, a step of checking operation rules described in an index, a step of forwarding a Push distribution message to other distributed directory server described in operation rules when Push distribution is performed according to operation rules, a step of a transmitting/receiving unit's checking a management unit of Pull-searched metadata when a Pull search message is received from a user device or other distributed directory server, a step of referring to an index database to search an index relating to the metadata, a step of returning the result, by superimposing the same on the Pull search response message, to the user device or other distributed directory server having transmitted the Pull search response message, a step of updating a totalized information database relating to the metadata, a step of checking operation rules described in the index, a step of forwarding a Pull search message to other distributed directory server described in the operation rules when Pull search is performed according to operation rules, a step of updating a forwarding list database, a step of obtaining data on a remaining resource from the resource measuring unit when interruption occurs, a step of obtaining data on a totalized function for the management unit from the totalized information database, a step of calculating costs for Push distribution and Pull search when a destination of each of the Push distribution and Pull search is changed for every management unit and computing an evaluation function, and a step of determining operation rules for Push distribution and Pull search for every management unit from computed results.

With the above configurations, the distributed directory server of the present invention, when receiving a Push distribution message from the user device or other distributed directory server, utilizes computed results of the evaluation function obtained in consideration of the balance among the effect realized by the Push distribution, costs, and remaining resource for determining operation rules to Push-distribute metadata to other distributed directory server. Also, the distributed directory server, when receiving a Pull search message from the user device or other distributed directory server, utilizes computed results of the evaluation function obtained in consideration of the balance among the effect realized by the Push distribution, costs, and remaining resource for determining operation rules to forward a Pull search message to other distributed directory server. This makes it possible to provide the distributed directory system which can circulate or search metadata effectively in terms of server costs.

BRIEF DESCRIPTION OF THE DRAWINGS

The above and other objects, advantages, and features of the present invention will be more apparent from the following description taken in conjunction with the accompanying drawings in which:

FIG. 4 is a conceptual diagram showing an example of a data configuration of the server information database shown in FIG. 2.

DETAILED DESCRIPTION OF THE PREFERRED EMBODIMENTS

Best modes of carrying out the present invention will be described in further detail using various embodiments with reference to the accompanying drawings.

Figure 1:
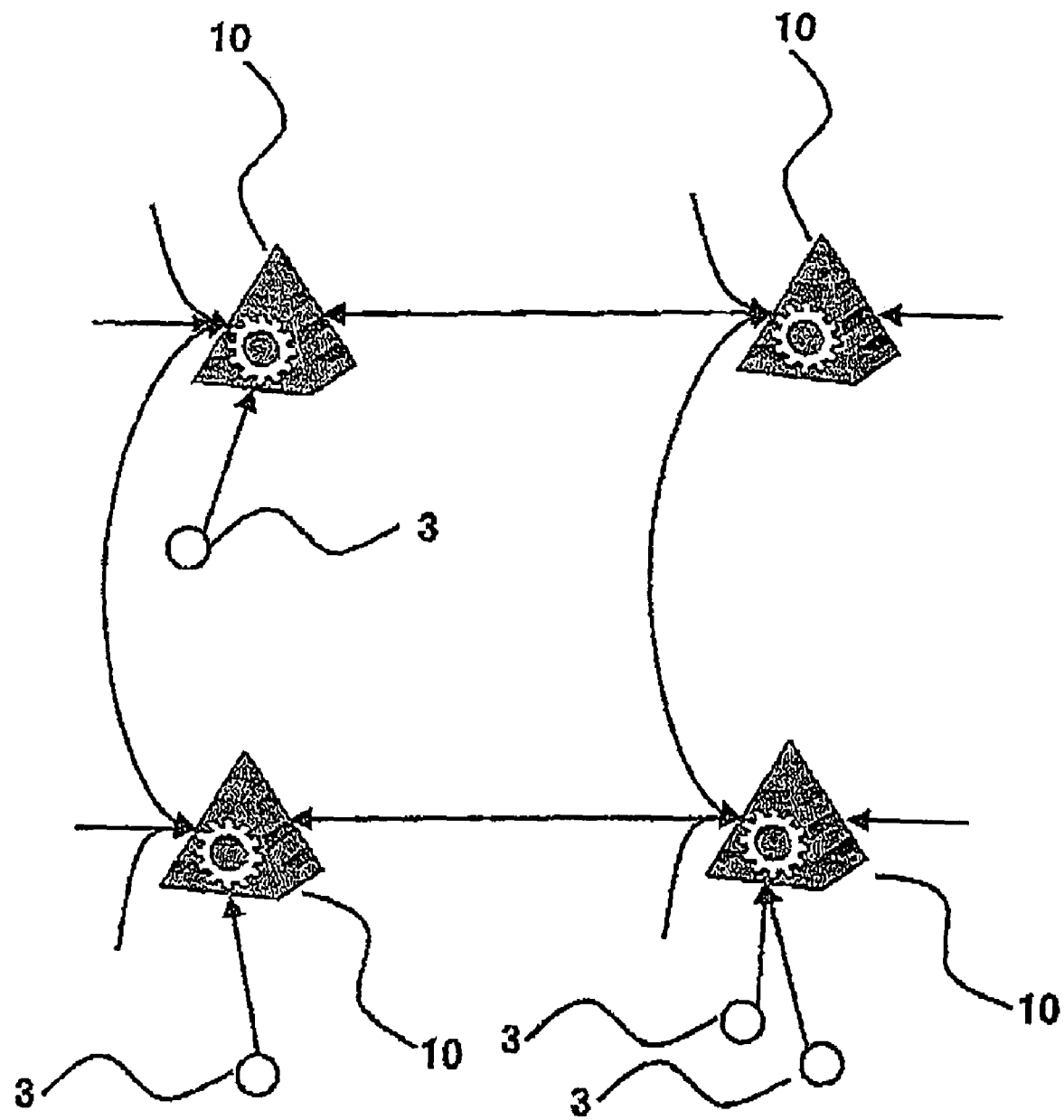
FIG. 1 is a conceptual diagram showing an example of a network configuration of a distributed directory system of the embodiment of the present invention.

FIG. 1 is a conceptual diagram showing an example of a network configuration of a distributed directory system of the embodiment of the present invention.

The distributed directory system 1 is made up of "m" units of distributed directory servers 10 and a plurality of user devices 3. Here, "m" is an integer of 2 or more. Each of the distributed directory servers 10 is connected to one another over a network.

In FIG. 1, the distributed directory servers 10 are connected in a lattice-like manner, however, a network topology of the server is not limited to the lattice.

Each of the user devices 3 is connected to given one of distributed directory servers through a communication means to utilize services. Here, the communication means is not limited to any specified one so long as the communication means is accessible to the distributed directory server 10.

The user device 3 utilizes services provided by the distributed directory server 10, while the user device 3 uploads information about contents that the user device 3 holds onto the distributed directory server 10 periodically or non-periodically. The contents here include photographs, moving images, voices, information written by the user, information obtained through a sensor device, or the like.

The user device 3 makes a request of the distributed directory system 1 for given contents information at any given time to get the contents information.

In the distributed system 1, distributed management of the contents information transmitted from the user device 3 is performed among distributed directory servers 10 to provide the contents information requested by the user device 3.

Figure 2:
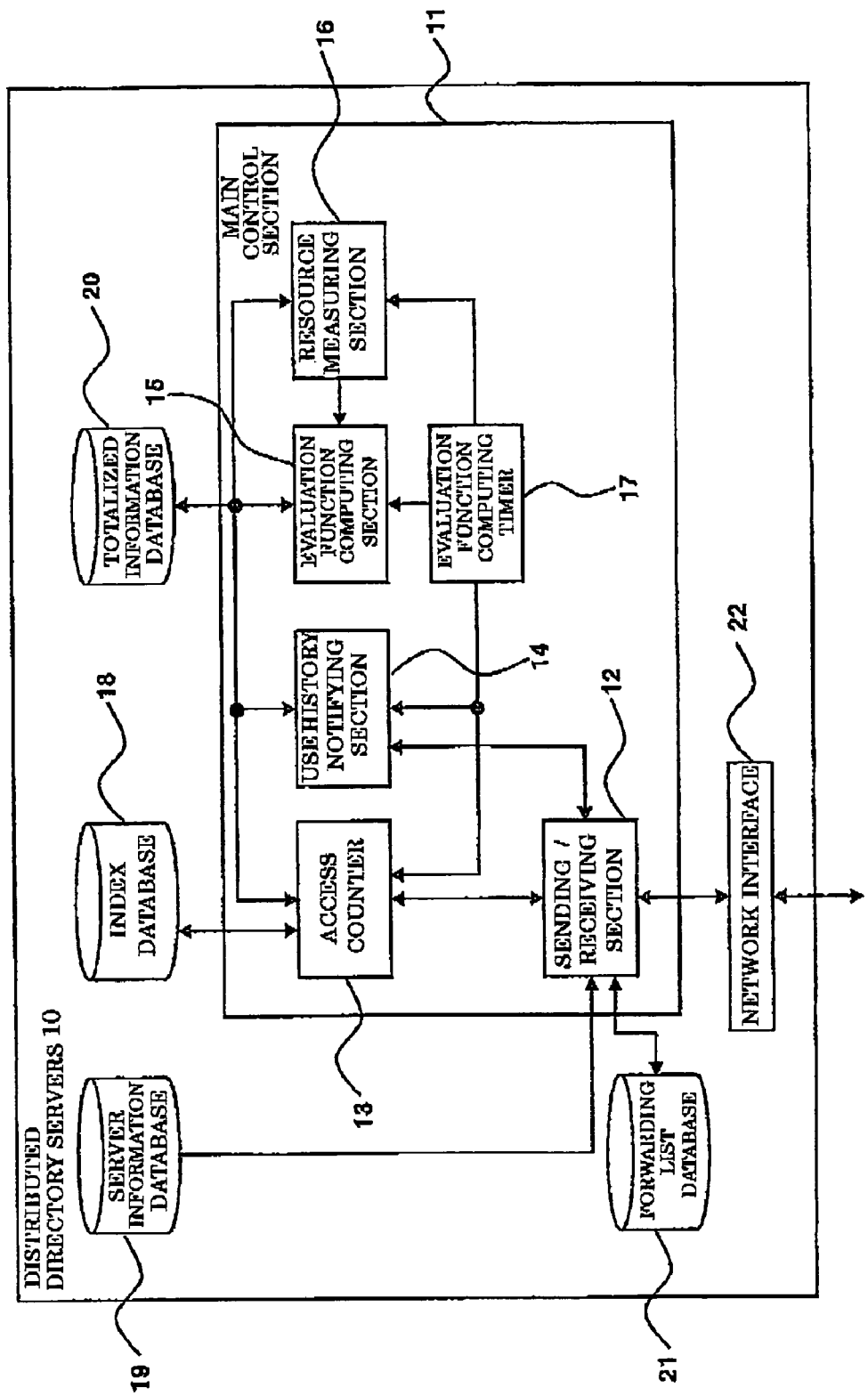
FIG. 2 is a block diagram showing configurations of the distributed directory server shown in FIG. 1.

FIG. 2 is a block diagram showing configurations of the distributed directory server 10 shown in FIG. 1.

The distributed directory server 10 includes a main control section 11, an index database 18, a server information database 19, a totalized information database 20, a forwarding list database 21, and a network interface 22.

The main control section 11 is a main portion of a computer made up of a CPU (Central Processing Unit), a RAM (Random Access Memory), and an OS (Operating System) on which a sending/receiving section 12, an access counter 13, a use history notifying section 14, an evaluation function computing section 15, a resource measuring section 16, and an evaluation function computing timer 17 operate as programs.

The sending/receiving section 12 receives a message from the user device 3 or other distributed directory server 10 through the network interface 22 and performs processing on the received message.

When the received message is a Pull search message, the sending/receiving section 12 accesses the index database 18 through the access counter 13 and then reads contents information relating to a corresponding index and superimposes the searched result on the Pull response message to return back the same. Further, when the Pull search message is forwarded to other distributed directory server 10 in accordance with operation rules described in the index, the sending/receiving section 12 reads the information about the corresponding distributed directory server 10 and forwards the Pull search message. At this time point, the sending/receiving section 12 writes an ID (Identification) of the forwarded message and searches information in the forwarding list database 21.

When the received message is a Pull search response message, the sending/receiving section 12 refers to the forwarding list database 21 to confirm the ID of the received message and to check whether or not overdue time contained in the search information is valid. If the overdue time is valid, the sending/receiving section 12 forwards the Pull search response message to a forwarding source described in the forwarding list database 21.

When the received message is a Push distribution message, the sending/receiving section 12 accesses the index database 18 through the access counter 13 and writes contents information described in the message in the index database 18. Further, if the sending/receiving section 12 forwards the Push distribution message to other distributed directory server 10 in accordance with the operation rules described in the index, the sending/receiving section 21 reads information about the corresponding distributed directory server 10 from the server information database 19 and forwards the Push distribution message.

When the received message is an index deleting message, the sending/receiving section 12 refers to the index database 18 and forwards the index deleting message to the distributed directory server 10 described in a column of a Push/Pull node of the corresponding index and deletes the corresponding index.

When the received message is a use history notifying message, the sending/receiving section 12 provides notification for instructing the use history notifying section 14 to update the number of times of using the corresponding Push data.

Also, the sending/receiving section 12 sends a use history notifying message in accordance with the notification from the use history notifying section 14 to the other corresponding distributed directory server 10.

Hereinafter, various messages that the sending/receiving section 12 sends and receives are described.

The Pull search message is a message having a specific ID to be transmitted from the user device 3 or other distributed directory server 10, which shows that the message sender wants to obtain the information about contents described in the message. The information described in the message is metadata relating to contents such as names of contents, key word, genre, kinds of files.

The Pull search response message is a response message to respond to the Pull search message and provides, as information about contents described in the Pull search message. The information described in the message is metadata relating to contents such as a name of contents, a keyword pertaining to contents, a genre, a contents producer, contents producing time, kinds of files, and the like.

The index deleting message is a message to delete an index and to provide notification for instructing the distributed directory server 10 that transmitted the corresponding index in the past as results of the Push distribution and Pull search to delete the corresponding index.

The use history notifying message is a message to be transmitted from other distributed directory servers 10 and to notify the number of times of using the Push data.

Figure 3:
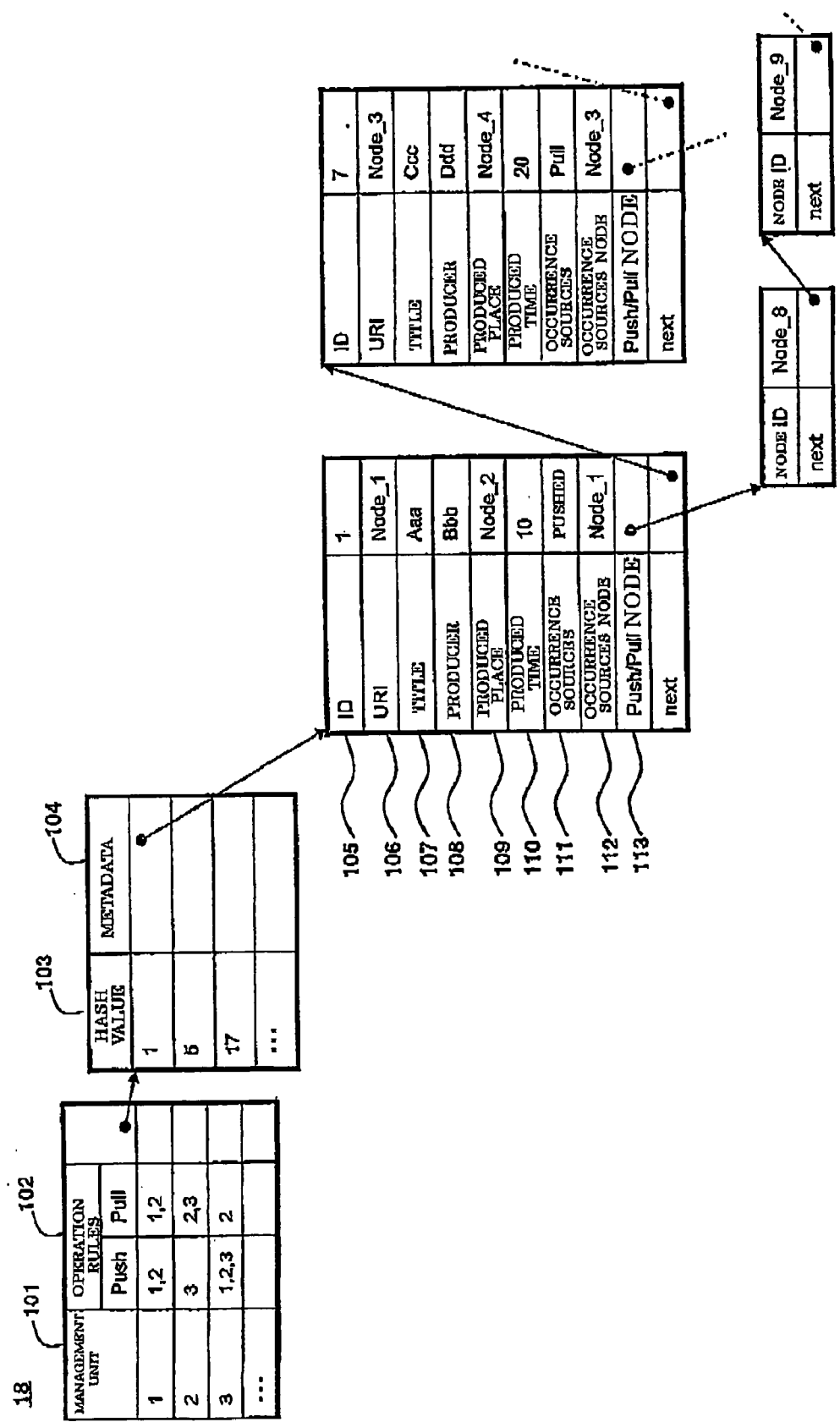
FIG. 3 is a conceptual diagram showing an example of a data configuration of the index database shown in FIG. 2.

FIG. 3 is a conceptual diagram showing an example of a data configuration of the index database 18 shown in FIG. 2.

The index is classified for every management unit in which operation rules are described and for every hash value. Below the hash value, part or whole of metadata of contents including the hash value is listed. In FIG. 3, as examples of the metadata of contents, an ID, URI (Universal Resource Identifier), title, producer, produced place, and produced time are listed.

The index includes items of occurrence sources. The occurrence source represents how the index has been obtained in which three kinds of commands including an original command obtained from the user device 3, Pushed command having been push-distributed from other distributed directory server 10, and Pull command obtained from other distributed directory server 10 due to a Pull search command issued by own server. The index is used to determine which use history in the totalized information list is to be updated.

Further, in items of occurrence source node, from what the index has been obtained is described.

The index has items of a Push/Pull node. In the Push/Pull node, to which distributed directory server 10 the index has been transmitted is stored. This index is used to delete the index.

FIG. 3 shows examples in which the index is managed for every management unit, however, the management unit denotes an amount of characteristics to classify a genre, kinds of contents, producer, producing place, or the like and, therefore, the index of the present invention may be managed by any kind of item.

Also, in the embodiment, the example is shown in which the metadata is classified by using a hash value, however, can be classified by using a value other than the hash value so long as the metadata can be determined uniquely.

The metadata described in the index is not limited to an ID, title, producer, producing place, and producing time and there is no limitation to kinds and the number of metadata so long as any metadata represents a characteristic of contents.

FIG. 4 is a conceptual diagram showing an example of a data configuration of the server information database 19 shown in FIG. 2.

The server information database 19 holds information about other distributed directory server to which own server is connected. The information about other distributed directory server includes a server name, IP (Internet Protocol) address of the server, port number, and the like.

Figure 5:
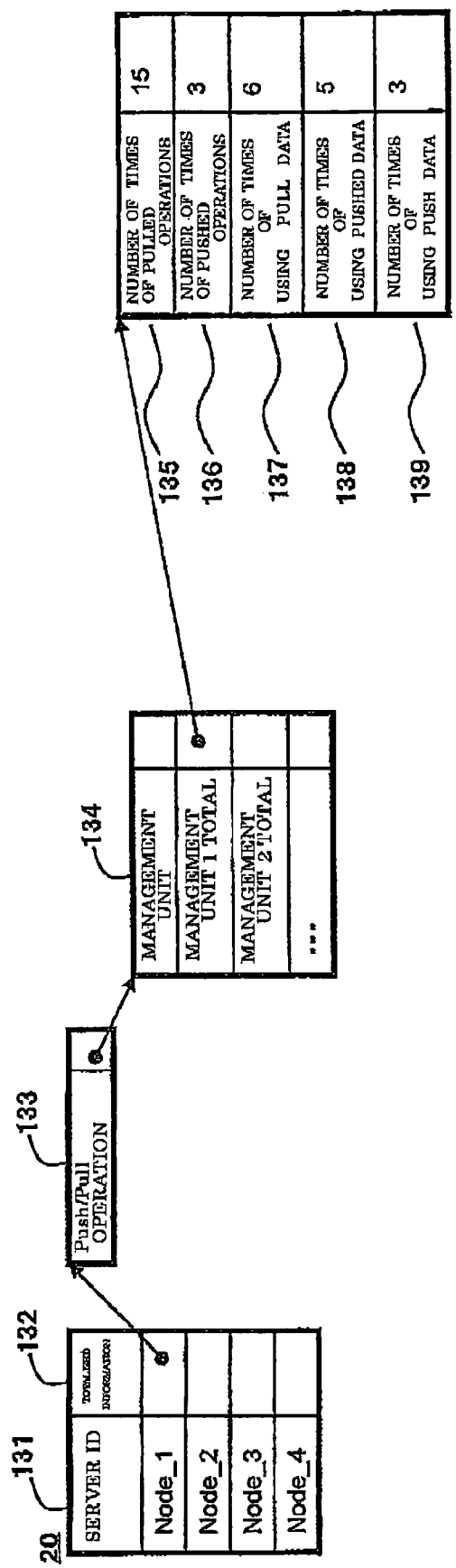
FIG. 5 is a conceptual diagram showing an example of a data configuration of the totalized information database shown in FIG. 2.

FIG. 5 is a conceptual diagram showing an example of a data configuration of the totalized information database 20 shown in FIG. 2.

The totalized information is managed for every neighboring server and is updated by the access counter 13 and is used for computation of an evaluation function. FIG. 5 shows an example in which the number of times of Push/Pull operations is totalized. The Push/Pull operation items are totalized for every management unit.

When the index database 18 is managed by other items, the Push/Pull operation items of the totalized information database 20 is totalized by the same items.

In the totalization for each management unit, the Push/Pull operations are totalized for the number of times of Pulled operations, the number of times of Pushed operations, the number of times of using the Pull data, the number of times of using the Pushed data, and the number of times of using the Push data.

The number of times of receiving the Pushed operation command is used for the prediction of the effect of Push operations in the evaluation function at the time of the distribution of Push commands and is a value obtained by totalizing how frequently the original index or Pushed index was pull-searched by other distributed directory server 10.

The number of times of receiving the Pushed operation command is used for server selection in the evaluation function at the time of the Pull search and is a value obtained by totalizing how frequently the index managed for every management unit was push-distributed by other distributed directory server 10.

The number of times of using the Pull data is used for the prediction of effects of Pull operations in the evaluation function at the time of the Pull search operations and is a value obtained by totaling how frequently the Pull index was pull-searched by other distributed directory server 10.

The number of times of using the Pushed data is used for notifying the number of times using the index Push-distributed from other distributed directory server 10 by using the use history notifying message and is a value obtained by totalizing how frequently the index Push-distributed from other distributed directory server 10 was used.

The number of times of using the Push data is used for the prediction of the effect of Push operations in the evaluation function at the time of the distribution of Push commands and is a value obtained by totalizing values notified by the use history notifying message from other distributed directory server 10.

FIG. 5 shows the example of totalizing the number of times of using the Push/Pull operations, however, the values obtained by totalizing the efficiency of exchange of information among neighboring servers, other information relating to costs, for example, data amount of transmitting and receiving messages can be used as the totalized information, or the like.

Figure 6:
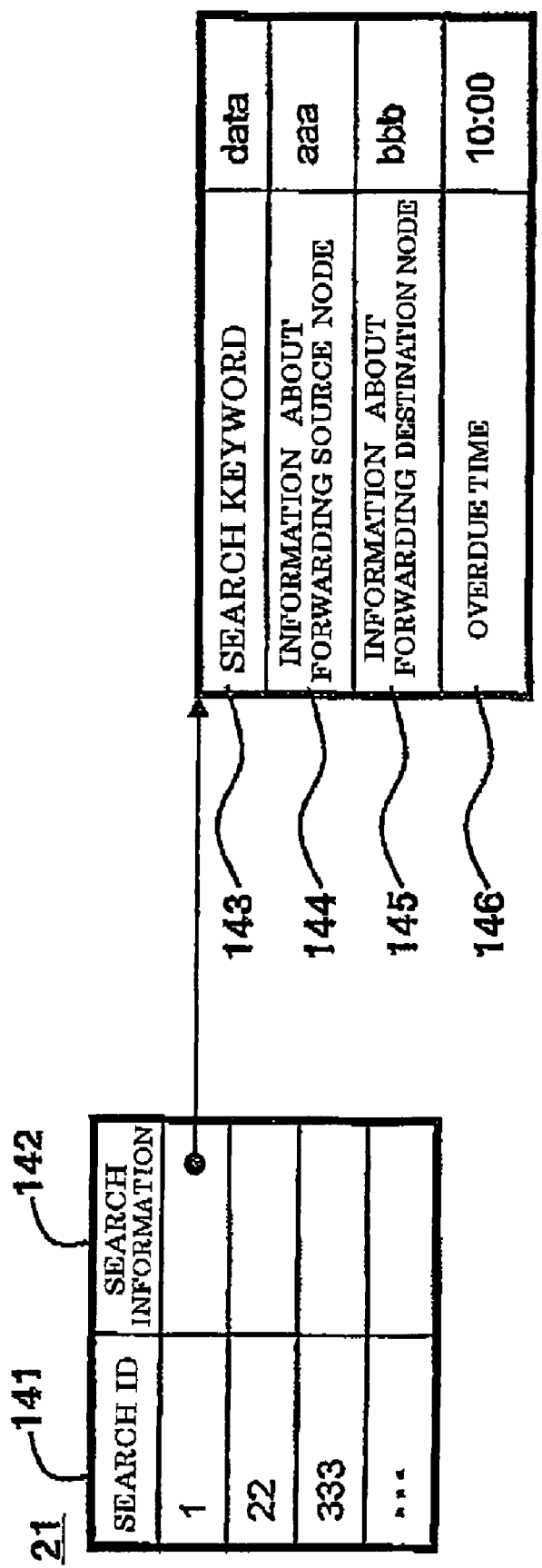
FIG. 6 is a conceptual diagram showing data configurations of the forwarding list data base shown in FIG. 2.

FIG. 6 is a conceptual diagram showing data configurations of the forwarding list data base 21 shown in FIG. 2.

In the forwarding list, the ID of the Pull search message and searched content. In the searched content column, a search keyword, information about a forwarding source node, information about the forwarding destination node, and overdue time information.

The overdue time is time obtained by adding holding time to forwarding time which represents until when response to a forwarded message is waited. The node information is information about a user device 3 serving as a forwarding source or a forwarding destination of a Pull search message, which contains server name, IP address of server, port number or the like.

The access counter 13 counts how frequently and which index was referred by the sending/receiving section 12 and updates totalized information contained in the totalized information data base.

The totalized information may be written in the totalized information database 20 every time when the information is updated or every time when the evaluation function computing timer 17 is driven.

The use history notifying section 14 operates at the time when the evaluation function computing timer 17 is driven and reads the totalized information data base 20 and provides notification for instructing the transmitting/receiving section 12 to transmit the number of times of using Pushed data to the distributed directory server 10.

When the index has been distributed from a plurality of distributed directory servers 10, the use history notifying section 14 provides notification for instructing the sending/receiving section 21 to transmit the use history notifying message to each of the distributed directory servers 10.

The evaluation function computing section 15 operates at the time when the evaluation function computing timer 17 is driven and determines operation rules of push distribution to each index for management unit. For example, in the case of computation for a given management unit, the totalized information about the management unit A is read from the totalized information database 20. Further, the evaluation function computing section 15 obtains data on its own remaining resource from the resource measuring section 16.

When operation rules for the Push distribution for the management unit A are determined, the effect occurring when the Push distribution begins with the totalized information about the management unit A is predicted. For example, the large total value of the number of times of the Pulled command and number of times of using the Push data is large, it is indicated that users indicate that there are many users who want to know the information about the management unit A and it can be, therefore, judged that the Push distribution effect is high.

Costs for the Push distribution are calculated. The costs stand for an amount of resources consumed by push and pull operations which are calculated from costs for the use of CPU load, RAM, communication bands, HDD (Hard Disk Driver), or the like.

The operation rules for Push command distribution are determined in consideration of costs and balance of remaining resources. For example, the result obtained by dividing the product of the Push command distribution effect and remaining resources by costs is used. The effect and costs vary by performing the Push command distribution to the distributed directory server which always varies. Therefore, the operation rules being well-balanced among the effect of the Push distribution, costs, and remaining resources can be determined by changing the servers to be Push-distributed in various ways.

Also, the evaluation function computing section 15 operates at the time when the evaluation function computing timer 17 is driven and operation rules for the Pull search to the index for every management unit are determined. For example, in the case of the computation for a given management unit A, totalized information relating to the management unit A is read from the totalized information database 20.

The remaining resource of own server is obtained from the resource measuring section 16. When operation rules for the Pull search for the management unit A are determined, the result occurring when the Pull search is performed from the totalized information relating to the management unit A is predicted. For example, if the number of using the Pull data is large, there are many users who want to know the information about the management unit A which shows a high reuse frequency and it is, therefore, judged that the Pull search effect is high.

Costs for the Pull search are calculated. The costs stand for an amount of resources consumed by push and pull operations which are calculated from costs for the use of CPU, RAM, communication bands, HDD (Hard Disk Driver), or the like.

In the case of the Pull search, the operation rules for Pull command distribution are determined in consideration of costs and balance of remaining resources. For example, the result obtained by dividing the product of the Pull command distribution effect and remaining resources by costs is used.

At this time, the effect and costs due to consumption vary depending on which distributed directory server receives Pull search. Therefore, the operation rules being well-balanced among the effect of the Push distribution, costs, and remaining resources can be determined by changing the servers to be Push distributed in various ways.

The resource measuring section 16 operates at the time when the evaluation function computing timer 17 is driven and measures the remaining resource of own server and, after converting the measured remaining resource into numerals, notifies the remaining source to the evaluation function computing section 15.

Here, the resource to be measured stands for an amount of capability of devices relating to performance of servers including an amount of CPU load, amount of use of RAM, amount of use of communication band, amount of use of HDD, or the like.

When the information about costs is being totalized by the totalized information database 20, the remaining resource of own server can be measured by using the information.

The evaluation function computing timer 17 notifies the use history notifying section 14, evaluation function computing section 15, resource measuring section 16, and access counter 13 of the timing of operation start. The operation start of all the components may be time-synchronized or time-asynchronized.

Figure 7:
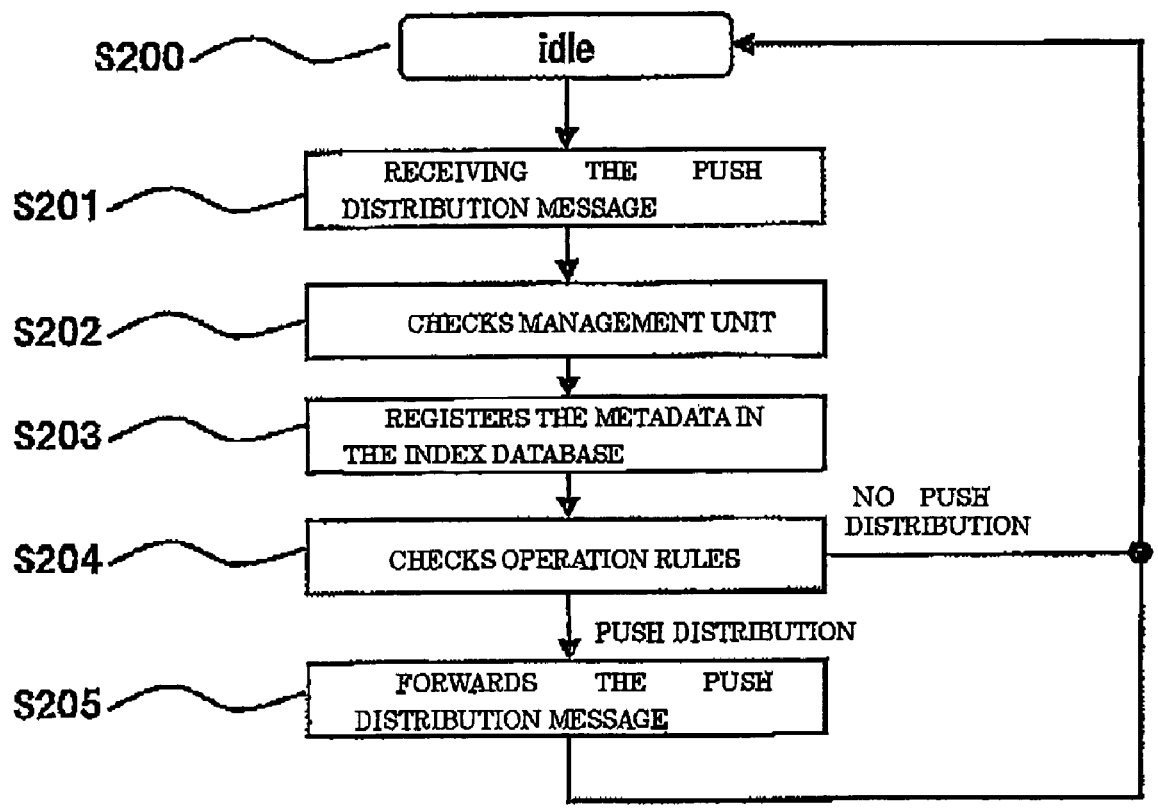
FIG. 7 is a flowchart showing operations of the distributed directory server shown in FIG. 2 in the case of receiving a Push distribution message from the user device or other distributed directory server.

FIG. 7 is a flowchart showing operations of the distributed directory server 10 shown in FIG. 2 in the case of receiving a Push distribution message from the user device 3 or other distributed directory server 10.

When operations of the distributed directory server 10 are started, the transmitting/receiving section 12 puts into a state (hereinafter, called an idle state) of waiting for a communication from the user device 3 or other distributed directory server 10 (S200).

The transmitting/receiving section 12, when receiving the Push distribution message from the user device 3 or other distributed directory server 10 (S201), checks management unit of metadata being Push-distributed (S202). The transmitting/receiving section 12 registers the metadata in the index database 18 (S203).

At this time point, the transmitting/receiving section 12 checks operation rules (S204). When the Push distribution message is not transmitted in accordance with operation rules, the transmitting/receiving section 12 returns the same back to its idle state (S204, No Push distribution). If the Push distribution message is transmitted in accordance with operation rules, the transmitting/receiving section 12 forwards the Push distribution message to other distributed directory server 10 designated in operation rules and returns the same back to the idle state (S204: Push distribution message is transmitted).

Figure 8:
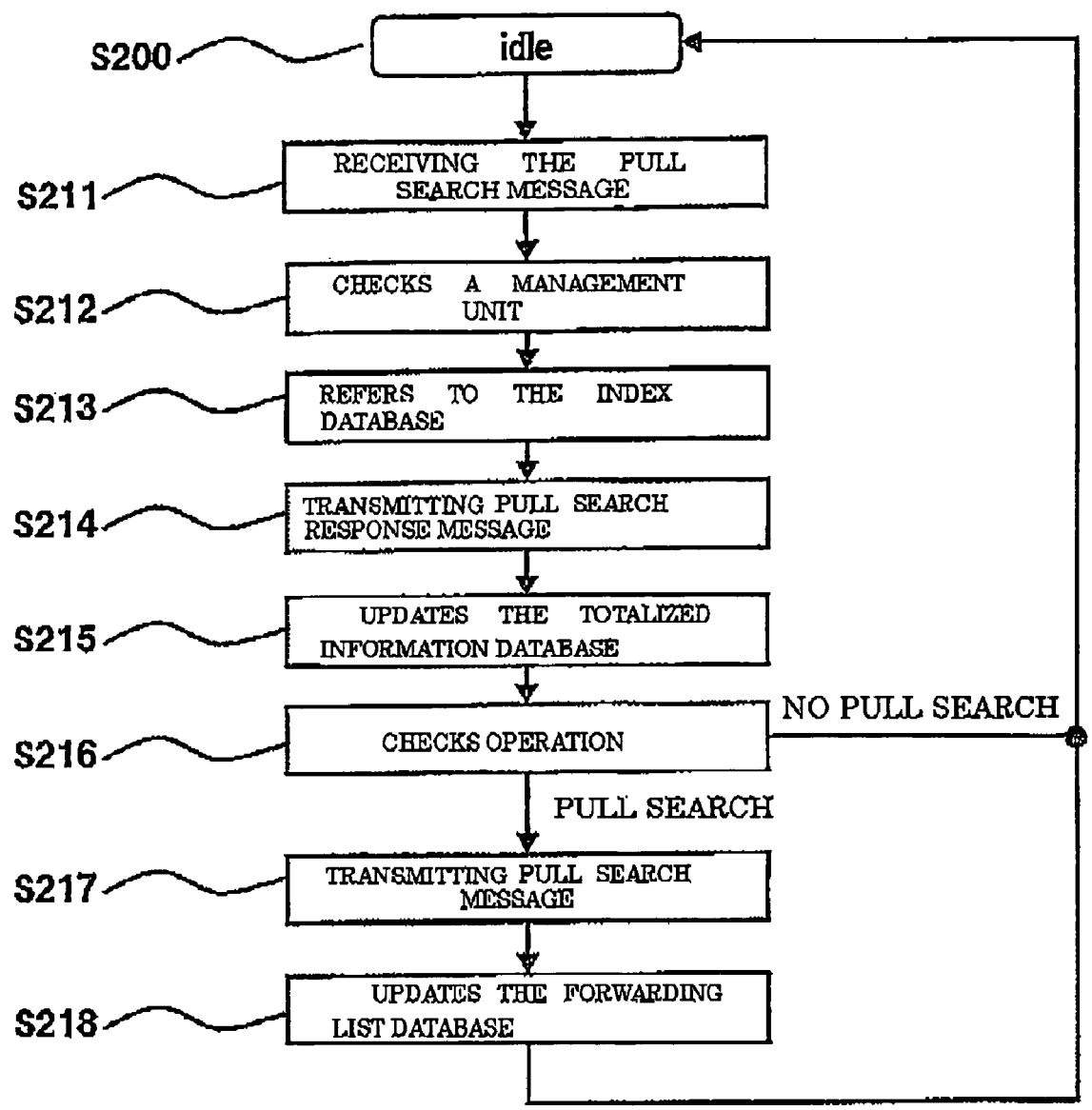
FIG. 8 is a flowchart showing operations of the distributed directory server shown in FIG. 2 in the case of receiving a Pull search message from the user device or other distributed directory server.

FIG. 8 is a flowchart showing operations of the distributed directory server 10 shown in FIG. 2 in the case of receiving a Pull search message from the user device 3 or other distributed directory server 10.

The transmitting/receiving section 12, when receiving the Pull search message from the user device 3 or other distributed directory server 10 (S211), checks a management unit of metadata being Push-distributed (S212).

Next, the transmitting/receiving section 12 refers to the index database 18 and retrieves the index of the metadata (S213). The transmitting/receiving section 12 superimposes the result on the Pull search response message to forward the same to the user device 3 or other distributed directory server 10 (S214).

Further, the transmitting/receiving section 12 updates the totalized information database for the metadata (S215).

The transmitting/receiving section 12 checks operation rules described in the index (S216) and returns the same to the idle state when no Pull search is performed in accordance with the operation rules (S216: No Pull search is performed). In the case of performing the Pull search according to operation rules (S216: Pull search is performed), the transmitting/receiving section 12 forwards the Pull search message to other distributed directory server 10 described in operation rules (S217). The transmitting/receiving section 12 updates the forwarding list database 21 (S218) and returns the same back to its idle state.

Figure 9:
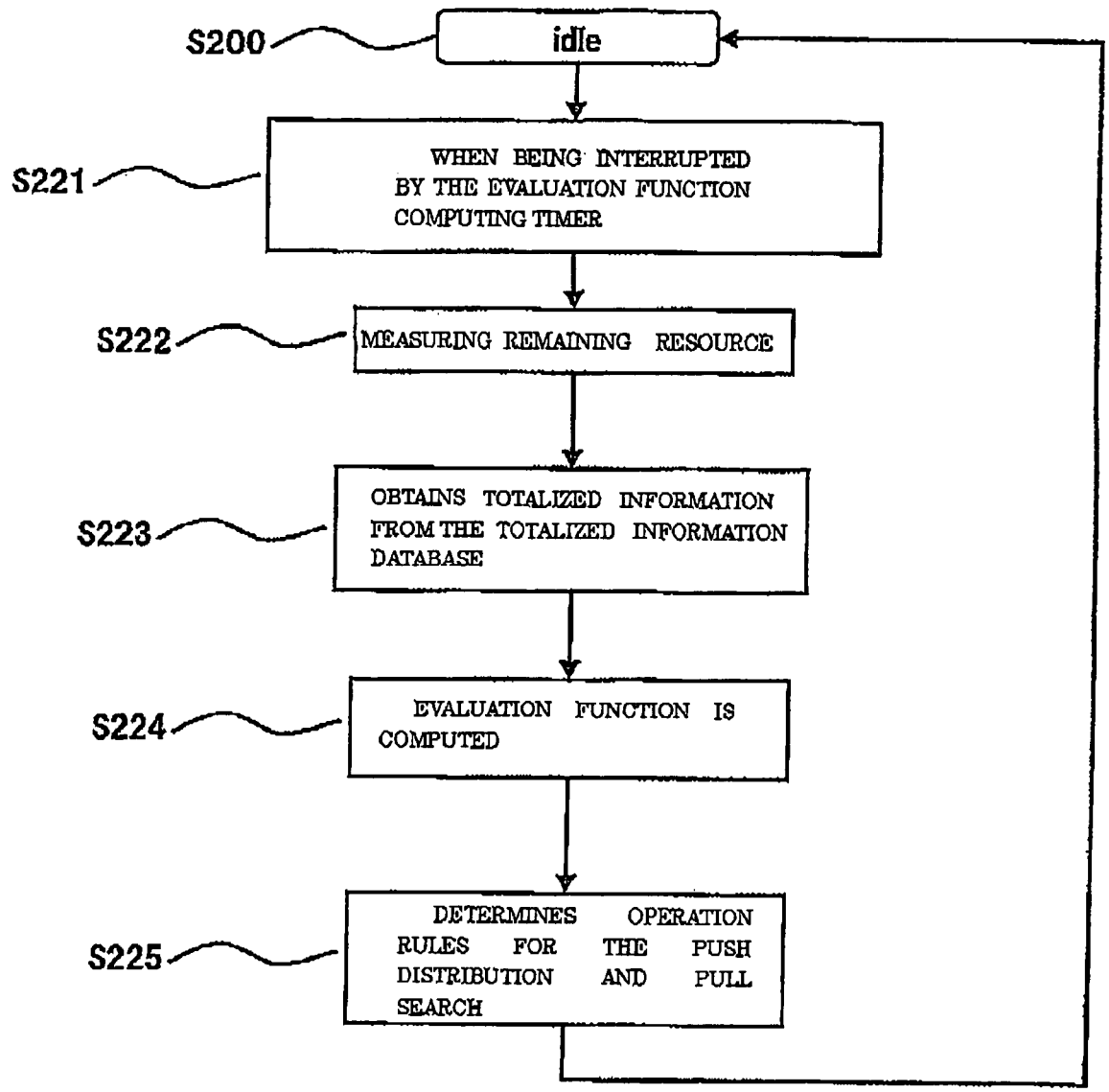
FIG. 9 is a flowchart showing operations of the distributed directory server shown in FIG. 2 when being interrupted by the evaluation function computing timer.

FIG. 9 is a flowchart showing operations of the distributed directory server 10 shown in FIG. 2 when being interrupted by the evaluation function computing timer 17.

The evaluation function computing section 15, when being in an idle state and interrupted (S221), obtains data on a remaining resource from the resource measuring section 16 (S222).

Further, the evaluation function computing section 15 obtains the Push distribution effect and Pull search effect from the totalized information database 20 (S223). The costs for the Push distribution and Pull search occurring when a forwarding destination for each of the Push distribution and Pull search is changed for a management unit are calculated and the evaluation function is computed (S224).

The evaluation function computing timer 17 determines operation rules for the Push distribution and Pull search for every management unit from the computed result (S225) and returns back to its idle state.

Moreover, operational contents in each of the steps in the flowchart described in FIGS. 7 to 9 can be configured to be executed as programs running on the computer (main control section 11) mounted in advance on the distributed directory server 10.

As described above, according to the embodiment of the present invention, the distributed directory server 10, when receiving a Push distribution message from the user device 3 or other distributed directory server 10, utilizes computed results of the evaluation function obtained in consideration of the balance among the effect realized by the Push distribution, costs, and remaining resource for determining operation rules to Push-distribute metadata to other distributed directory server. Also, the distributed directory server 10, when receiving a Pull search message from the user device 3 or other distributed directory server 10, utilizes computed results of the evaluation function obtained in consideration of the balance among the effect realized by the Push distribution, costs, and remaining resource for determining operation rules to forward a Pull search message to other distributed directory server 10. This makes it possible to provide the distributed directory system 1 which can distribute or search metadata effectively in terms of server costs.

It is apparent that the present invention is not limited to the above embodiments but may be changed and modified without departing from the scope and spirit of the invention and, so long as effects of the present invention can be obtained, any one of other known configurations can be employed.

What is claimed is:

1. A distributed directory server to be used in a distributed directory system that comprises a plurality of distributed directory servers and a plurality of user devices connected to one another through a network, said server comprising:

a transmitting/receiving unit to transmit or receive messages among the user devices and other distributed directory servers;

a use history noticing unit to read a totalized information database and to provide a notification for instructing the transmitting/receiving unit to transmit data on a number of times of using Pushed data to the distributed directory server; and an evaluation function computing unit to determine operation rules for Push distribution and Pull search processes to an index for every management unit, wherein the evaluation function computing unit operates at a time when the evaluation function computing timer is driven, reads totalized information about an index for every management unit from the totalized information database, obtains data on a remaining resource of the distributed directory server from a resource measuring unit, predicts effects occurring when the Push distribution is performed from totalized information about the Push distribution process of the index, calculates costs from an amount of consumed resources, including costs for a use of CPU (Central Processing Unit), RAM (Random Access Memory), communication-bands, and HDD (Hard Disk Drive) which are consumed at a time of operations of the Push distribution and determines the operation rules for the Push distribution process in a consideration of a balance among an effect realized by the Push distribution, costs, and remaining resources.

2. The distributed directory server according to claim 1, further comprising:

an index database to classify and manage the index containing metadata including an ID (Identification), a URI (Universal Resource Identifier), a producer, a producing place, a producing time, an occurrence source, an occurrence source node, and a Push/Pull node;

a server information database to hold information about an other distributed directory server to which the distributed directory server is connected;

a totalized information database to classify and manage data on a number of times of Pulled commands, a number of times of Pushed commands, a number of times of using Pull data, a number of times of using Pushed data, and a number of times of using Push data; and a forwarding list database to manage an ID of a Pull search message, a search keyword, forwarding source node information, forwarding destination node information, and a search content including an overdue time and to perform a management to determine until when a response to a message forwarded by the transmitting/receiving unit is to be waited for.

3. The distributed directory server according to claim 2, further comprising:

an access counter to count how frequently the transmitting/receiving unit refers to which index and to update totalized information about the totalized information database;

a resource measuring unit to measure a remaining resource of the distributed directory server and, after converting the remaining resource into numerals, to notify the evaluation function computing unit of the remaining resource; and an evaluation function computing timer to notify the use history notifying unit, the evaluation function computing unit, the resource measuring unit, and the access counter of a timing for operation start.

4. The distributed directory server according to claim 1, wherein the transmitting/receiving unit, when a received message is a Pull search message, accesses an index database through an access counter and superimposes results on a Pull search response message to return the results and, when forwarding the Pull search message to other distributed directory server according to the operation rules described in the index, reads information about a corresponding distributed directory server and forwards the Pull search message and writes an ID of the transferred message and search information in a forwarding list database.

5. The distributed directory server according to claim 1, wherein the transmitting/receiving unit, when a received message is a Pull search response message, refers to a forwarding list database and checks an ID of the received message and checks whether or not an overdue time in the search information is valid and, when the overdue time is valid, forwards the Pull search response message to a forwarding resource described in the forwarding list database.

6. The distributed directory server according to claim 1, wherein the transmitting/receiving unit, when a received message is a Push distribution message, accesses an index database through an access counter and writes contents information described in the index to the index database and, when forwarding the Push distribution message to other distributed directory server in accordance with the operation rules described in the index, reads information about a corresponding distributed directory server from the server information database and forwards the Push distribution message.

7. The distributed directory server according to claim 1, wherein the transmitting/receiving unit, when a received message is an index deleting message, refers to an index database and forwards the index deleting message to the distributed directory server described in a column of a Push/Pull node of a corresponding index to delete the corresponding index.

8. The distributed directory server according to claim 1, wherein the transmitting/receiving unit, when a received message is a use history notifying message, provides a notification for instructing the use history notifying message to update a number of times of using corresponding Push data.

9. The distributed directory server according to claim 1, wherein the transmitting/receiving unit transmits a use history notifying message to a corresponding other distributed directory server in accordance with notification from the use history notifying unit.

10. The distributed directory server according to claim 9, wherein the use history noting unit further provides the notification for instructing the transmitting/receiving unit to transmit data on a number of times of using Pushed data to the distributed directory server and, when an index has been distributed from a plurality of distributed directory servers, provides the notification for instructing the transmitting/receiving unit to transmit the use history notifying message to each of the distributed directory servers.

11. The distributed directory server according to claim 1, wherein an access counter counts how frequently the transmitting/receiving unit refers to which index and updates totalized information of the totalized information database.

12. The distributed directory server according to claim 1, wherein the evaluation function computing timer notifies each of the use history noticing unit, the evaluation function computing unit, and the resource measuring unit, an access counter of a timing of operation start.

13. A distributed directory server to be used in a distributed directory system that comprises a plurality of distributed directory servers and a plurality of user devices connected to one another through a network, said server comprising:

a transmitting/receiving unit to transmit or receive messages among the user devices and other distributed directory servers;

a use history noticing unit to read a totalized information database and to provide a notification for instructing the transmitting/receiving unit to transmit data on a number of times of using Pushed data to the distributed directory server; and an evaluation function computing unit to determine operation rules for Push distribution and Pull search processes to an index for every management unit, wherein the evaluation function computing unit changes the servers to be used for the Push distribution and determines the operation rules being well-balanced among an effect of the Push distribution, costs, and remaining resources by using a result obtained by dividing a product of a Push command distribution effect and remaining resources by costs.

14. A distributed directory server to be used in a distributed directory system that comprises a plurality of distributed directory servers and a plurality of user devices connected to one another through a network, said server comprising:

a transmitting/receiving unit to transmit or receive messages among the user devices and other distributed directory servers;

a use history noticing unit to read a totalized information database and to provide a notification for instructing the transmitting/receiving unit to transmit data on a number of times of using Pushed data to the distributed directory server; and an evaluation function computing unit to determine operation rules for Push distribution and Pull search processes to an index for every management unit, wherein the evaluation function computing unit operates at a time when the evaluation function computing timer is driven, reads totalized information about an index for every management unit from the totaled information database, obtains data on a remaining resource of the distributed directory server from a resource measuring unit, predicts effects occurring when a Push distribution is performed from totalized information about a Pull search of the index, calculates costs from an amount of consumed resources including costs for a use of CPU (Central Processing Unit), RAM (Random Access Memory), communication-bands, and HDD (Hard Disk Drive) which are consumed at a time of operations of the Push distribution and determines the operation rules for the Push distribution in consideration of a balance among an effect realized by the Pull search, costs, and remaining resources.

15. A distributed directory server to be used in a distributed directory system that comprises a plurality of distributed directory servers and a plurality of user devices connected to one another through a network, said server comprising:

a transmitting/receiving unit to transmit or receive messages among the user devices and other distributed directory servers;

a use history noticing unit to read a totalized information database and to provide a notification for instructing the transmitting/receiving unit to transmit data on a number of times of using Pushed data to the distributed directory server; and an evaluation function computing unit to determine operation rules for Push distribution and Pull search processes to an index for every management unit, wherein the evaluation function computing unit changes the servers to be used for the Pull search operation and determines the operation rules being well-balanced among an effect of the Pull search operation, costs, and remaining resources, by using a result obtained by dividing a product of a Pull command distribution effect and remaining resources by costs.

16. A distributed directory server to be used in a distributed directory system that comprises a plurality of distributed directory servers and a plurality of user devices connected to one another through a network, said server comprising:

a transmitting/receiving unit to transmit or receive messages among the user devices and other distributed directory servers;

a use history noticing unit to read a totalized information database and to provide notification for instructing the transmitting/receiving unit to transmit data on a number of times of using Pushed data to the distributed directory server; and an evaluation function computing unit to determine operation rules for Push distribution and Pull search processes to an index for every management unit, wherein a resource measuring unit operates at a time when the evaluation function computing timer is driven and measures a remaining resource of the distributed directory server represented as an amount of capability of devices relating to a performance of servers including an amount of CPU (Central Processing Unit) load, an amount of use of RAM (Random Access Memory), an amount of use of communication band, an amount of use of HDD (Hard Disk Drive), and, after converting a measured remaining resource into numerals, notifies the remaining resource to the evaluation function computing section.

17. A distributed directory system in which a plurality of distributed directory servers and a plurality of user devices are connected to one another through a network and the plurality of distributed directory servers the comprises a distributed directory server stated in claim 1.

18. A distributed directory managing method for managing contents information in a distributed manner in a distributed directory system that comprises a plurality of distributed directory servers and a plurality of user devices being connected to one another through a network, the method comprising:

a Push distribution message processing of a Push distribution message received from the user devices or other distributed directory servers;

a Pull search message processing of a Pull search received from the user devices or other distributed servers; and an evaluation function computing of determining operation rules for Push distribution operation from totalized information and Pull search, wherein the evaluation function computing method comprises:

obtaining data on a remaining resource from a resource measuring unit;

obtaining data on a Push distribution effect and a Pull search effect from a totalized information database;

calculating costs for Push distribution and Pull search processes when a destination of each of the Push distribution message and Pull search message is changed for every management unit and computing the evaluation function; and determining the operation rules for the Push distribution and Pull search processes for every management unit from computed results and making the distributed directory server return back its idle state.

19. The distributed directory managing method according to claim 18, wherein the Push distribution message processing comprises:
- receiving a Push distribution message from a user device or other distributed directory server;
- checking a management unit for Push-distributed metadata;
- registering the metadata in an index database;
- checking the operation rules described in the index;
- making the distributed directory server return back to its idle state when a Push distribution process is not performed according to the operation rules; and
- forwarding a Push distribution message to other distributed directory servers described in the operation rules when the Push distribution process is performed and of making the distributed directory server return back to its idle state.

20. The distributed directory managing method according to claim 18, wherein the Pull search message processing comprises:
- receiving a Pull search message from a user device or other distributed directory server;
- checking a management unit for Pull-searched metadata;
- referring to an index database to search for an index relating to the metadata;
- returning a result from searching to the user device or other distributed directory server having transmitted the Pull search message by superimposing the result on the Pull search response message;
- updating the totalized information database for the metadata;
- checking the operation rules described in the index;
- making the distributed directory server return back to its idle state when the Pull search process is performed according to the operation rules;
- forwarding the Pull search message to other directory server described in the operation rules when the Pull search process is performed according to the operation rules; and
- updating a forwarding list database and making the distributed directory server return its idle state.

21. A non-transitory computer-readable storage medium encoded with a distributed directory program for making a computer mounted on each distributed directory server in a distributed directory system that comprises a plurality of distributed directory servers and a plurality of user devices connected to one another through a network execute processes, the distributed directory program including instructions for a method comprising:
- checking a management unit for Push-distributed metadata when the distributed directory server receives a Push distribution message from the user device or other distributed directory server;
- registering the metadata in an index data base;
- checking operation rules described in an index;
- forwarding a Push distribution message to an other distributed directory server described in the operation rules when the Push distribution is performed according to the operation rules;
- a transmitting/receiving unit checking a management unit of Pull-searched metadata when a Pull search message is received from a user device or other distributed directory server;
- referring to the index database and searching an index relating to the metadata;
- returning a result, by superimposing the result on the Pull search response message, to the user device or other distributed directory server having transmitted the Pull search response message;
- updating a totalized information database relating to the metadata;
- checking the operation rules described in the index;
- forwarding a Pull search message to an other distributed directory server described in the operation rules when the Pull search is performed according to the operation rules;
- updating a forwarding list database;
- obtaining data on a remaining resource from a resource measuring unit when an interruption occurs;
- obtaining data on a totalized function for the management unit from the totalized information database;
- calculating costs for a Push distribution and a Pull search when a destination of each of the Push distribution and Pull search is changed for every management unit and computing an evaluation function; and
- determining operation rules for the Push distribution and the Pull search for every management unit from computed results.

* * * * *